(12) United States Patent
Nomura

(10) Patent No.: US 6,315,352 B1
(45) Date of Patent: Nov. 13, 2001

(54) CONSTRUCTION FOR AUTOMOBILES THAT RELATES SEAT DEVICE AND CAR BODY TO EACH OTHER

(75) Inventor: Hidemasa Nomura, Ikeda (JP)

(73) Assignee: Daihatsu Motor Co., Ltd., Osaka (JP)

( * ) Notice: Subject to any disclaimer, the term of this patent is extended or adjusted under 35 U.S.C. 154(b) by 0 days.

(21) Appl. No.: 09/534,871

(22) Filed: Mar. 24, 2000

(30) Foreign Application Priority Data

Mar. 26, 1999 (JP) .................................................. 11-084984

(51) Int. Cl.⁷ ....................................................... B60N 2/00
(52) U.S. Cl. ........................... 296/202; 296/146.1; 296/64
(58) Field of Search ................. 296/146.1, 202, 296/64, 155, 146.9, 203.03

(56) References Cited

U.S. PATENT DOCUMENTS 2,716,438 * 8/1955 Furst ........................................ 296/64

FOREIGN PATENT DOCUMENTS

001800785 * 7/1970 (DE) .................................. 296/146.1

9-109778 4/1997 (JP) .................................. B60R/7/04

* cited by examiner

Primary Examiner—Joseph D. Pape
(74) Attorney, Agent, or Firm—Michael D. Bednarek; Shaw Pittman LLP

(57) ABSTRACT

A construction for automobiles that relates a seat device and a car body to each other. The seats disposed in the interior of a car body and the lateral walls having door openings at positions adjacent these seats as seen widthwise of the car body are related to each other. The rear opening edge of the driver's door opening formed in the lateral wall is positioned rearwardly of the rear opening edge of the assistant driver's door opening formed in the other lateral wall. In addition to the lateral walls, only the one that is formed with the assistant driver's door opening, may be formed with a rear door opening adjacent the rear seat device as seen widthwise of the car body. Also, a rear door may be provided that opens and closes the rear door opening as desired. The rear door being movable along the outer surface of the lateral wall and rearwardly for forward travel and also moved for backward travel.

5 Claims, 4 Drawing Sheets

CONSTRUCTION FOR AUTOMOBILES THAT RELATES SEAT DEVICE AND CAR BODY TO EACH OTHER

FIELD OF THE INVENTION

The present invention relates to a construction for automobiles that relates a seat device and a car body to each other, and more particularly it relates to a construction by which the seats disposed in the interior of a car body and the lateral walls having door openings at positions adjacent these seats as seen widthwise of the car body are related to each other.

BACKGROUND OF THE INVENTION

As for constructions for automobiles that relate a seat device and a car body to each other, the following one has been previously proposed.

A car body has a car interior floor constituting the lower portion thereof, and a pair of lateral walls extending upward from the sides of the car interior floor and constituting the sides of the car body. Front and rear seat devices are installed in the car interior surrounded by said car interior floor and said opposite lateral walls. The front seat device comprises a driver's seat and an assistant driver's seat that are disposed side by side as seen widthwise of the car body, said driver's seat being supported so that it can be moved with respect to the car interior floor lengthwise of the car body.

Of the opposite lateral walls, the one on the side of the driver's seat is formed with a driver's door opening adjacent the driver's seat as seen widthwise of the car body, while the lateral wall on the side of the assistant driver's seat is formed with an assistant driver's door opening adjacent the assistant driver's seat as seen widthwise of the car body. A steering shaft is installed that extends rearwardly upward from below the front region of the driver's seat toward the driver's seat, with a steering wheel mounted on the projecting end of said steering shaft.

The opposite lateral walls are each provided with a rear door opening adjacent the rear seat device as seen widthwise of the car body, and front and rear doors are installed to open and close these door openings.

The driver is allowed to get in and out of the car through said driver's door opening, and when he gets in the car and sits on the driver's seat, he can handle the steering wheel. By handling the steering wheel, he can drive the car.

In this connection, the prior art described above has the following problem.

For example, when the driver is trying to put baggage, or to sit a child, on said rear seat device from a place outside the car outwardly laterally of said driver's seat (which work will be hereinafter referred to as "work on the rear seat device"), first he opens the rear door opening through manipulation directed to the rear door and does "work on the rear seat device," whereupon he again closes said rear door opening through manipulation directed to the rear door and then he opens the driver's door opening through manipulation directed to the front door to get in the car and he sits on the driver's seat, whereupon he again closes the driver's door opening through manipulation directed to the front door.

However, as described above, in order for the driver to do "work on the rear seat device," he has to perform manipulation directed to the front door for opening/closing the driver's door opening, and get in the car through the driver's door opening and besides these, he has to perform manipulation directed to the rear door for opening/closing the rear door opening; thus, "work on the rear seat device" is troublesome to the driver.

Accordingly, it will be contemplated to do "work on the rear seat device" through the driver's door opening alone without performing manipulation directed to the rear door.

However, the driver's door opening adjoins the driver's seat as seen widthwise of the car body and the area of the driver's door opening is small; thus, "work on the rear seat device" would still be troublesome.

On the other hand, it will also be contemplated to form said driver's door opening in such a manner as to increase its area so that getting in and out of the car and "work on the rear seat device" may be easily attained through this driver's door opening.

If, however, the driver's door opening is formed simply to increase its area, the strength of the lateral wall on the side of the driver's seat tends to be lower than that of the lateral wall on the side of the assistant driver's seat, resulting in making the opposite lateral walls unequal in strength, which is undesirable from the standpoint of the strength of the car body.

Further, if the seatback of the driver's seat is turned forwardly downward to assume a forwardly inclined position and if this driver's seat is forwardly moved over a substantial distance, then it is expected that the situation of the rear side of the driver's door opening being adjacent the driver's seat is eliminated, thus increasing the substantial opening area of the rear region of the driver's door opening; thus, it will be thought that such arrangement facilitates "work on the rear seat device."

However, in the above case, simply inclining the seatback forwardly downward and moving the driver's seat forwardly over a substantial distance could result in the seatback of the driver's seat accidentally colliding with the steering wheel, imposing an unnecessary external force on the steering wheel.

Therefore, the operation of forwardly inclining the seatback with respect to the driver's seat and forwardly moving the latter should be performed with attention paid to the installed position of the steering wheel. Thus, it is not easy to smooth "work on the rear seat device."

SUMMARY OF THE INVENTION

An object of the invention is to ensure that when a driver is trying to do "work on the rear seat device," which is the work of putting baggage or the like on the rear seat device from a place outside the car outwardly laterally of said driver's seat, this work can be easily done by the driver.

Another object of the invention is to ensure that even when said "work on the rear seat device" is facilitated for the driver, the opposite lateral walls of the car body are uniform in strength with each other.

Another object of the invention is to ensure that during "work on the rear seat device," no unnecessary external force is applied to the steering wheel constituting the front seat device and positioned forwardly of the driver's seat, thereby making it possible to do said work smoothly.

According to the invention, there is provided a construction for automobiles that relates a seat device and a car body to each other, including a car body having a car interior floor constituting the lower portion thereof, and a pair of lateral walls constituting the sides of the car body, front and rear seat devices installed in the car interior surrounded by said car interior floor and said opposite lateral walls, said front seat device having a driver's seat and an assistant driver's seat that are disposed side by side as seen widthwise of the car body, said driver's seat being supported so that it can be moved with respect to the car interior floor as seen longitudinally of the car body, the lateral wall on the side of the driver's seat being formed with a driver's door opening adjacent the driver's seat as seen widthwise of the car body, the lateral wall on the side of the assistant driver's seat being formed with an assistant driver's door opening adjacent the assistant driver's seat as seen widthwise of the car body, a steering shaft installed to project rearwardly upward in front of the driver's seat toward the driver's seat, with a steering wheel mounted on the projecting end of said steering shaft, said construction being characterized in that the rear opening edge of said driver's door opening formed in the lateral wall is positioned rearwardly of the rear opening edge of the assistant driver's door opening formed in the other lateral wall.

Other objects, arrangements, functions and effects than those described above will become clear from a detailed description of the invention with reference to the accompanying drawings.

BRIEF DESCRIPTION OF THE DRAWINGS

The figures show a preferred embodiment of the invention.

DETAILED DESCRIPTION OF THE PREFERRED EMBODIMENTS

Figure 1:
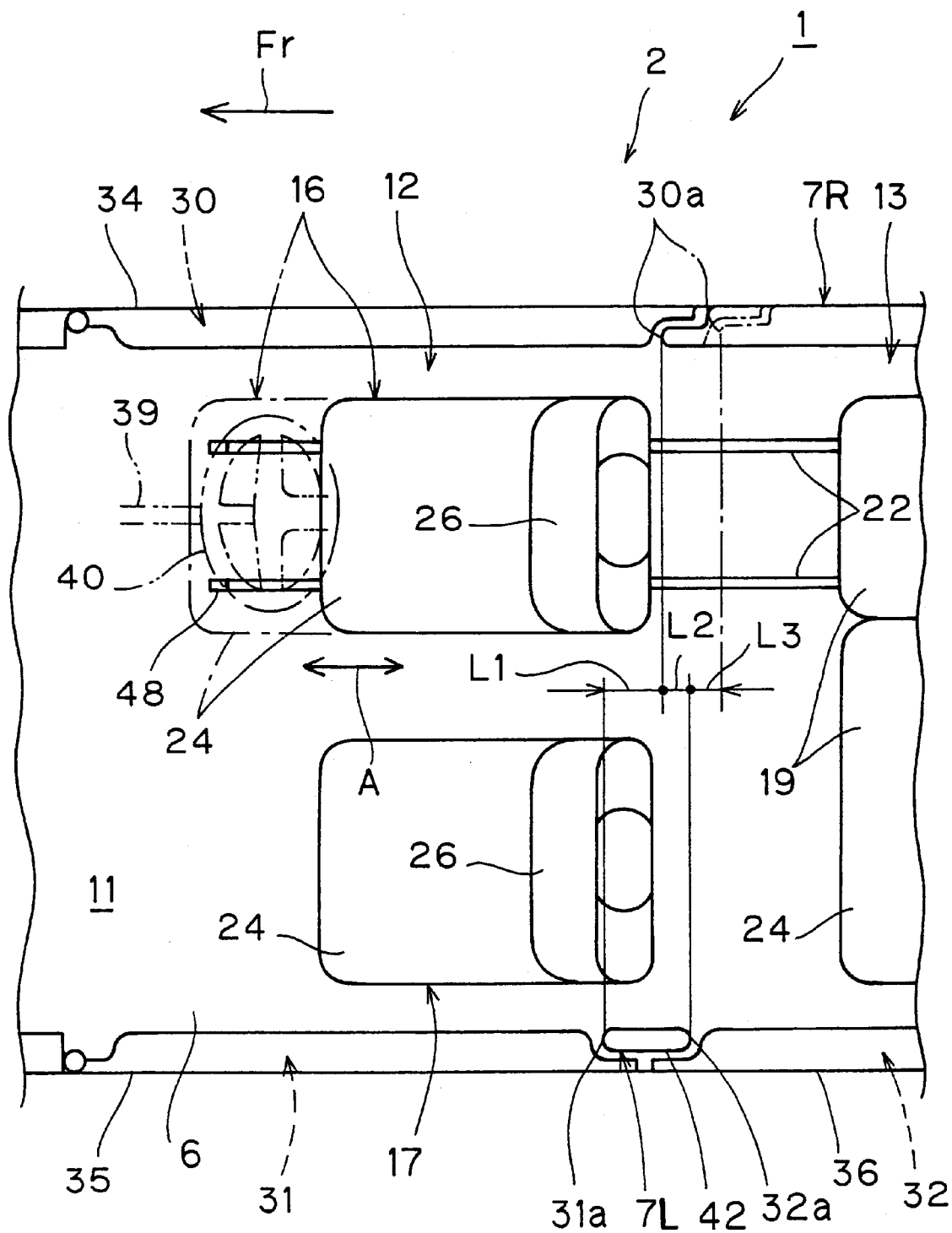
FIG. 1 is a partial enlarged view of FIG. 3.

In the figures, the reference character 1 denotes a one-box type automobile, and the arrow Fr indicates the forward direction of this automobile. The term "transverse direction" used hereinafter refers to the widthwise direction of the car body 2 as seen in the forward direction.

The car body 2 is supported on a road 4 by front and rear wheels 3. The car body 2, which is made of metal sheet, comprises a car interior floor 6 constituting the lower portion thereof and substantially horizontally and flatwise extending, a pair of lateral walls 7R and 7L constituting the sides of the car body 2 and extending upward from the sides of the car interior floor 6, a roof panel 8 constituting the upper portion of the car body 2 and carried on the upper ends of the opposite lateral walls 7R and 7L, and a front wall 9 closing the space surrounded by each front end edges of said car interior floor 6, lateral walls 7R and 7L and the roof panel 8.

The inner space of the car body 2 surrounded by the car interior floor 6, lateral walls 7R and 7L, roof panel 8 and front wall 9 provides a car interior 11. This car interior 11 has front and rear seat devices 12 and 13 spaced longitudinally of the car body. Further, disposed rearwardly of said rear seat device 13 is another rear seat device 14.

The front seat device 12 comprises a driver's seat 16 and an assistant driver's seat 17 disposed side by side as seen widthwise of the car body. The driver's seat 16 is disposed on one side (right-hand side) of the car interior 11 and the assistant driver's seat 17 on the other side (left-hand side) of the car interior 11. The rear seat device 13 comprises a pair of rear seats 19 arranged widthwise of the car body.

The driver's seat 16 is supported such that it is movable (as shown at A) longitudinally of the car body with respect to the car interior floor 6.

As shown in solid lines in each figure, a pair of rails 22 are installed on the portion of the car interior floor 6 lying under the driver's seat 16 to extend linearly lengthwise of the car body.

The driver's seat 16 comprises a seat block 23 supported only for longitudinal movement on the rails 22, a seat cushion 24 supported on the upper surface of the seat block 23 for movement together with the seat block 23, and a seatback 26 projecting upward from the rear end of said seat cushion 24. The seatback 26 is pivotally supported at the rear end of said cushion 24 by a pivot means 25 so that it can be turned forwardly downward for forward turning (indicated by the arrow B in FIG. 4) and backwardly for backward turning (opposite to B).

The driver's seat 16 shown in solid lines in each figure is in its prepared position ready for sitting, with a seat cushion 24 extending substantially horizontally and a seatback 26 in its erected position. The pivot means 25 has a reclining mechanism, allowing the seatback 26 to be held in a desired angular position.

There is provided an unillustrated locking means (not shown in the figures) by which the seat block 23 of the driver's seat 16 is removably locked on said rails 22 in a desired longitudinal position to hold said driver's seat 16 in that position. When a driver sits on the driver's seat 16 in the normal operating state, the driver's seat 16 is held in the position shown in solid lines in each figure and located longitudinally with respect to the car body.

The assistant driver's seat 17 and rear seat 19, like the driver's seat 16, are provided with a seat block 23, a seat cushion 24, a pivot means 25, and a seatback 26, and are each in its prepared position ready for sitting, as shown in solid lines in each figure.

Of the lateral walls 7R and 7L, the one 7R located on the side of the driver's seat 16 as seen widthwise of the car body is formed with a driver's door opening 30 adjacent the driver's seat 16, while the lateral wall 7L located on the side of the assistant driver's seat 17 is formed with an assistant driver's door opening 31 adjacent the assistant driver's seat 17. Further, of the lateral walls 7R and 7L, the left-hand side lateral wall 7L alone, which is formed with said assistant driver's door opening 31, is formed with a rear door opening 32 adjacent the left-hand side of the rear seat device 13 as seen widthwise of the car body.

Figure 3:
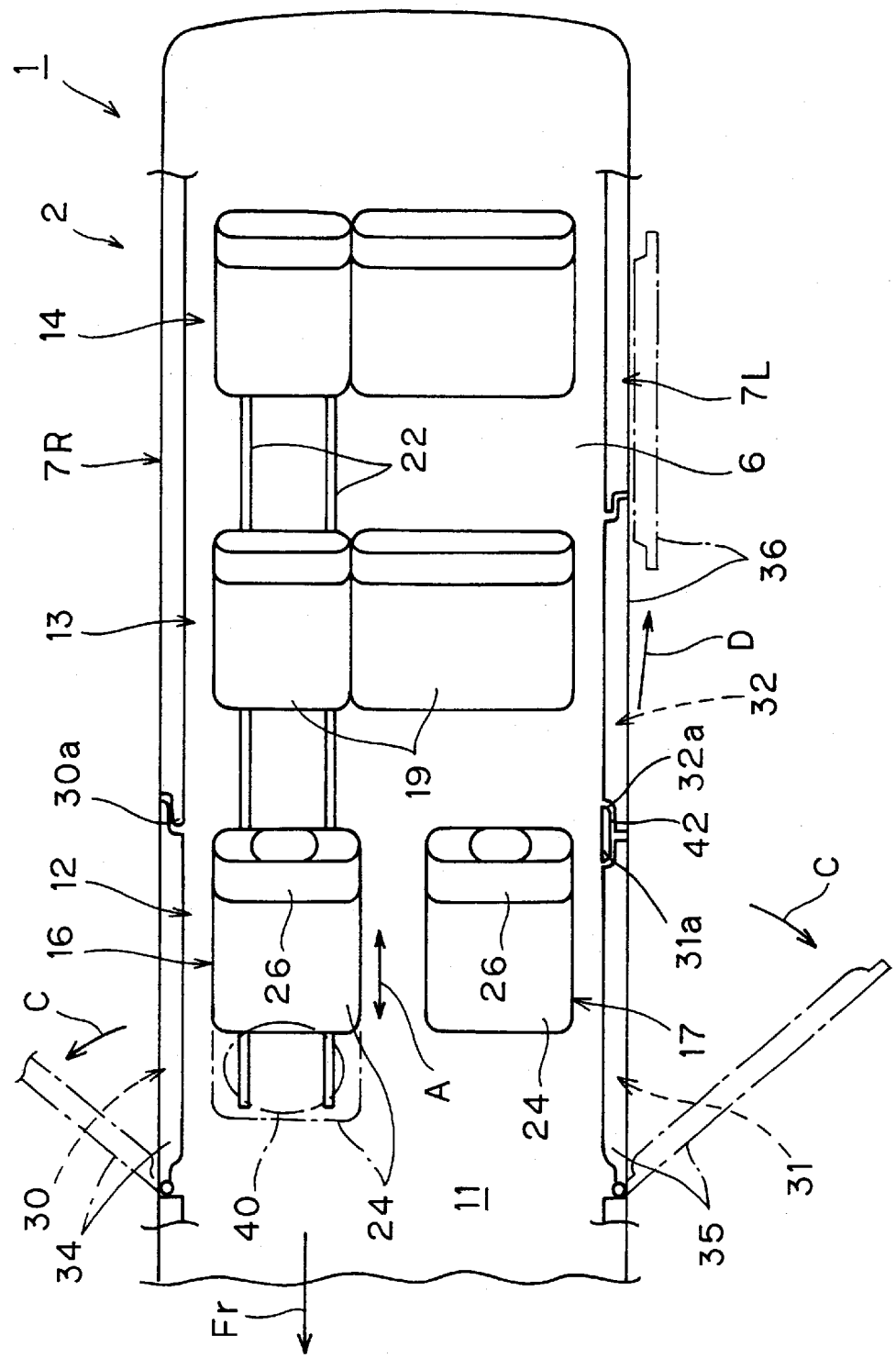
FIG. 3 is a complete plan vie of the automobile.

The driver's and assistant driver's door openings 30 and 31 are respectively provided with front doors 34 and 35 that can be opened and closed as desired. The front regions of these front doors 34 and 35 are pivotally supported by the front opening edges of the driver's and assistant driver's door openings 30 and 31 formed in the lateral walls 7R and 7L, so that the rear sides of the front doors 34 and 35 are turnable around these pivots outwardly of the car body 2 for forward turning (indicated by the arrow C in FIG. 3) and backwardly for backward turning (opposite to C). The forward turning (C) of the front doors 34 and 35 opens the driver's and assistant driver's door openings 30 and 31, while the backward turning (opposite to C) of the front doors 34 and 35 closes the driver's and assistant driver's door openings 30 and 31.

A rear door 36 is provided that opens and closes the rear door opening 32 as desired. This rear door 36 is supported by a guide rail on the lateral wall 7L so that it can be moved along the outer surface of the lateral wall 7L, rearwardly, for forward travel (indicated by the arrow D in FIG. 3) and also moved for backward travel (opposite to D). The forward travel (D) of the rear door 36 opens the rear door opening 32 and the backward travel (opposite to D) of the rear door 36 closes the rear door opening 32.

A steering shaft 39 is installed that extends rearwardly upward from below the front region of the driver's seat 16 toward the driver's seat 16. The steering shaft 39 is disposed in the front region on the right-hand side of the car interior 11 and supported in the front portion of the car body 2 so that it can be turned around its own axis. The lower end of the steering shaft 39 is operatively connected to the front wheels 3. A circular steering wheel 40 is mounted on the upper end of and coaxially with said steering shaft 39, said steering wheel 40 being supported such that it is orthogonal to the axis of the steering shaft 39.

Figure 4:
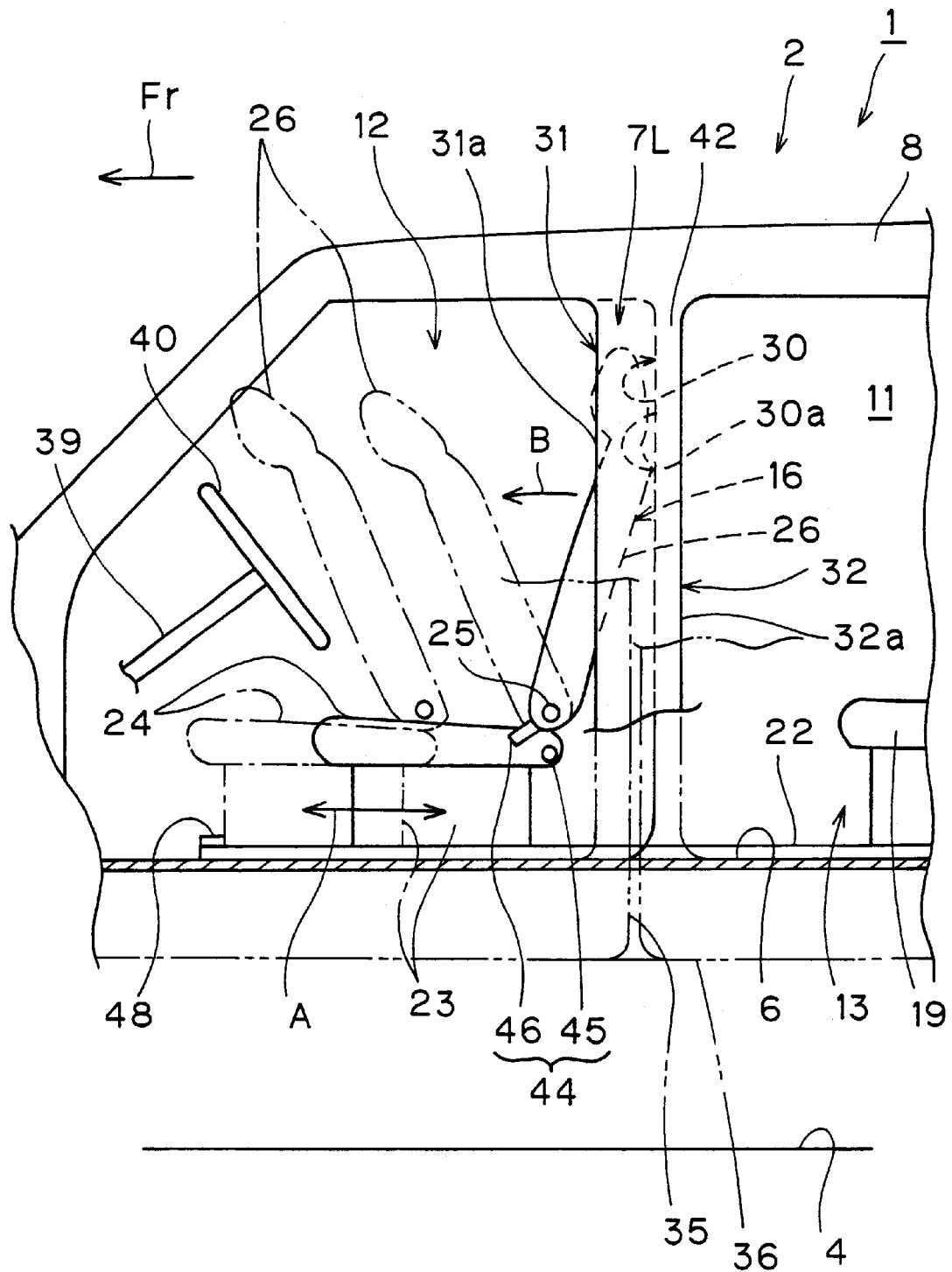
FIG. 4 is a partial enlarged view of FIG. 2.

In FIGS. 1 and 4, the front opening edges of the driver's and assistant driver's door openings 30 and 31 formed in the lateral walls 7R and 7L are positioned substantially in the same plane as seen longitudinally. On the other hand, the rear opening edge 30a of the driver's door opening 30 formed in the lateral wall 7R is positioned rearwardly, by a dimension L1, of the rear opening edge 31a of the assistant driver's door opening 31 formed in the other lateral wall 7L.

As seen longitudinally of the car body, the portion of the lateral wall 7L positioned between the assistant driver's door opening 31 and the rear door opening 32 is a center pillar 42 extending vertically over a substantial distance. The rear opening edge 30a of the driver's door opening 30 is positioned in the intermediate portion of the center pillar 42 as seen longitudinally of the car body. Further, the rear opening edge 30a of the driver's door opening 30 is positioned forwardly, by a dimension L2, of the front opening edge 32a of the rear door opening 32 formed in the other lateral wall 7L.

In addition, as indicated by dashed lines in FIG. 1, the rear opening edge 30a of the driver's door opening 30 may be positioned rearwardly, by a dimension L3, of the front opening edge 32a of the rear door opening 32. In this case, a rear region of the driver's door opening 30 and a front region of the rear door opening 32 lie in the same plane as seen in a side view of the car body 2.

The driver's seat 16 is provided with an unillustrated walk-in device. The driver's seat 16 shown in solid lines in the figures is shown in its prepared position ready for sitting, and is held in a desired position by said locking means (not shown). If the seatback 26 is forwardly turned (B) through a predetermined angle from this state (as shown in two-dot chain lines in FIGS. 2 and 4), the locking of the locking means (not shown) is automatically cancelled, allowing the driver's seat 16 to move back and forth longitudinally with respect to the car body.

Figure 2:
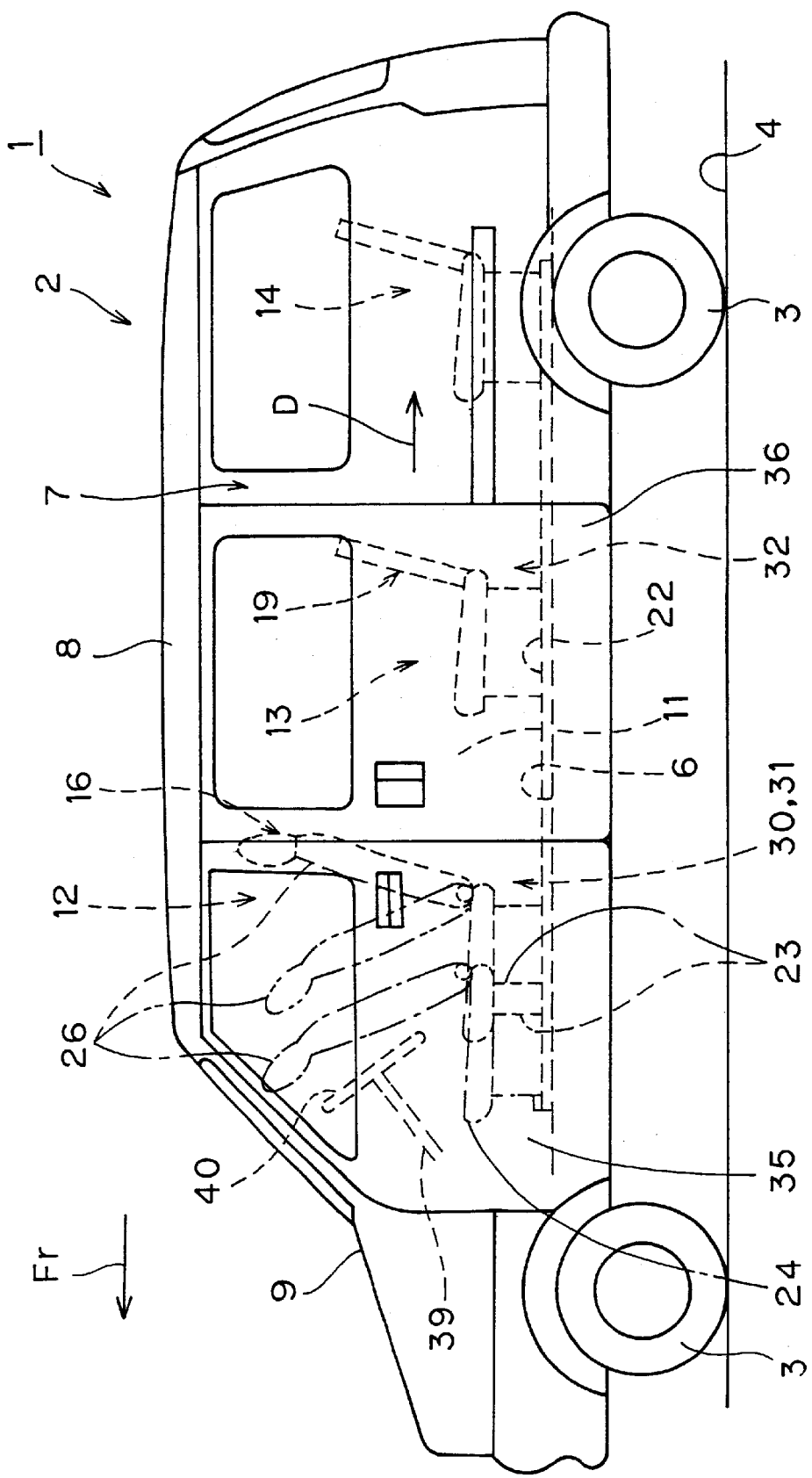
FIG. 2 is a complete side view of an automobile.

In FIG. 4, there is provided a forward inclination preventing means 44 by which when the seatback 26 is forwardly turned (B) to assume a "forwardly inclined position" having substantially the same inclination as that of said steering wheel 40 as shown in two-dot chain lines in FIGS. 2 and 4, its further forward turning (B) is prevented.

The forward inclination preventing means 44 comprises a stop 45 projecting from the seat cushion 24, and an arm 46 projecting from the seatback 26. When the seatback 26 is forwardly turned (B) to assume the "forwardly inclined position," the arm 46, which has turned together with the seatback 26, abuts against the stop 45 so that the seatback 26 is prevented from further forward turning (B).

There is provided a movement preventing means 48 by which when the driver's seat 16 is moved forward until the seatback 26 having assumed the "forwardly inclined position" is close to the steering wheel 40 (shown in dashed lines in figures), a further forward movement of the driver's seat 16 is prevented, said movement preventing means 48 being attached to the front ends of the rails 22.

In the above arrangement, when the operation of putting baggage or the like on the rear seat device 13 in the car interior 11 from a place outside the car outwardly laterally of the outer side of the driver's seat 16, i.e., when "work on the rear seat device" is to be performed, the following work will be done.

First, the driver's door opening 30 is opened through manipulation directed to the front door 34. Then, the seatback 26 of the driver's seat 16 is caused to assume the "forwardly inclined position" through the driver's door opening 30, thereby automatically canceling the locking means (not shown) to move the driver's seat 16 forward as a whole (as shown in dashed lines in the figures). Thereupon, this forward movement of the driver's seat 16 results in increasing the substantial opening area of the rear region of the driver's door opening 30.

Further, as described above, the rear opening edge 30a of the driver's door opening 30 is positioned rearwardly of the rear opening edge 31a of the assistant driver's door opening 31.

Therefore, the substantial opening area of the rear region of the driver's door opening 30 becomes larger, thus facilitating said "work on the rear seat device" through the driver's door opening 30.

Then the driver's seat 16 is moved rearward through the driver's door opening 30 to return to the original position and resume the prepared position ready for sitting. Then, the driver getting in the car through said driver's door opening 30 is allowed to sit on the driver's seat 16. Thereafter, if the driver's door opening 30 is closed through manipulation directed to the front door 34, it becomes possible to drive the automobile 1.

Thus, according to the above arrangement, in doing "work on the rear seat device" from a place outside the car outwardly laterally of the driver's seat 16, it is easier for the driver to do said work than in the conventional work individually operating two doors, front and rear, installed on the lateral wall on the side of the driver's seat.

In this connection, if the rear opening edge 30a of the driver's door opening 30 is positioned rearwardly of the rear opening edge 31a of the assistant driver's door opening 31, as described above, the opening area of the driver's door opening 30 becomes larger, tending to make the strength of the lateral wall 7R on the driver's seat 16 correspondingly lower than that of the lateral wall 7L on the side of the assistant driver's seat 17.

However, whereas the lateral wall 7L on the side of the assistant driver's seat 17 is formed with the rear door opening 32 disposed adjacent the rear portion of the assistant driver's door opening 31 as described above, the lateral wall 7R on the side of the driver's seat 16 has no other door opening disposed adjacent the rear portion of the driver's door opening 30; therefore, even if the opening area of the driver's door opening 30 is somewhat increased, the strengths of the right and left lateral walls 7R and 7L are prevented from becoming imbalanced.

Thus, as described above, while "work on the rear seat device" can be easily done, the strengths of the right and left lateral walls 7R and 7L of the car body 2 are maintained equal to each other, a merit advantageous from the standpoint of the strength of the car body 2.

Further, as described above, the rear opening edge 30a of the driver's door opening 30 is positioned rearwardly of the rear opening edge 31a of the assistant driver's door opening 31; in other words, the rear opening edge 31a of the assistant driver's door opening 31 is positioned forwardly of the rear opening edge 30a of the driver's door opening 30. Therefore, the front opening edge 32a of the rear door opening 32 positioned rearwardly of the assistant driver's door opening 31 can be positioned further forward without being impeded by the rear opening edge 31a of the assistant driver's door opening 31. That is, as seen longitudinally of the car body, the front side of the rear door opening 32 can be brought closer to the rear side of the driver's door opening 30.

Thus, in cases where the driver and the assistant driver cooperate with each other to do said "work on the rear seat device" with respect to a transversely long piece of baggage from a place outside the car outwardly laterally of the driver's seat 16 and a place outside the car outwardly laterally of the rear seat device 13 that is outside the car on the side of the assistant driver's seat 17, the "work on the rear seat device" to be done by said cooperation through these openings 30 and 32 will be all the easier because the rear side of the driver' door opening 30 and the front side of the rear door opening 32 longitudinally approach each other, as described above.

Further, as described above, there is provided the rear door 36 for opening and closing the rear door opening 32 and this rear door 36 is made movable rearwardly along the outer surface of the lateral wall 7L for forward travel (D) and also movable for backward travel (opposite to D).

Therefore, when the rear door 36 is moved for forward travel (D) to open the rear door opening 32 (dashed lines in FIG. 3) , the front region of the rear door opening 32 is opened to a greater extent than in the case where turnable doors such as said front doors 34 and 35 are provided for opening and closing the rear door opening 32: thus, it is substantially fully opened.

Thus, the "work on the rear seat device" to be done by said cooperation through the openings 30 and 32 becomes much easier to do.

Further, as shown in dashed lines in FIG. 1, in the case where the rear end of the driver's door opening 30 and the front end of the rear door opening 32 lie in the same plane as seen in a side of the car body 2, the "work on the rear seat device" to be done by cooperation between the driver and the assistant driver becomes much easier to do.

Further, as described above, there is provided the forward inclination preventing means 44 by which when the seatback 26 is forwardly turned (B) to assume a "forwardly inclined position" having substantially the same inclination as that of said steering wheel 40, its further forward turning is prevented.

Therefore, when the seatback 26 is caused to assume the "forwardly inclined position" with the intention of increasing the substantial opening area of the rear region of the driver's door opening 30 when it is desired to do "work on the rear seat device," unintentional colliding of the seatback 26 with the steering wheel 40 is prevented by said forward inclination preventing means 44.

Thus, application of an unnecessary external force to the steering wheel 40 is prevented during "work on the rear seat device" without having to pay attention to the presence of the steering wheel 40, thereby making it possible to do said work smoothly.

Further, as described above, there is provided the movement preventing means 48 by which when the driver's seat 16 is moved forward until the seatback having assumed the "forwardly inclined position" is close to the steering wheel 40, a further forward movement of the driver's seat 16 is prevented.

Therefore, when the seatback 26 is moved forward over a substantial distance with the intention of increasing the substantial opening area of the rear region of the driver's door opening 30 when it is desired to do "work on the rear seat device," unintentional colliding of the seatback 26 with the steering wheel 40 is prevented by said movement preventing means 48.

Thus, application of an unnecessary external force to the steering wheel 40 is prevented during "work on the rear seat device" without having to pay attention to the presence of the steering wheel 40, thereby making it possible to do said work smoothly.

In addition, while what has been described above is based on the illustrated example, the driver's and assistant driver's seats 16 and 17 may be arranged reversely as seen widthwise of the car body, in which case the driver's and assistant driver's door openings 30 and 31 and the rear door opening 32 formed in the lateral walls 7R and 7L will be arranged reversely as seen widthwise of the car body.

Further, the present invention may be embodied by suitably combining the individual components described above.

What is claimed is:

1. A construction for automobiles that relates a seat device and a car body to each other, including a car body having a car interior floor constituting the lower portion thereof, and a pair of lateral walls constituting the sides of the car body, front and rear seat devices installed in the car interior surrounded by said car interior floor and said opposite lateral walls, said front seat device having a driver's seat and an assistant driver's seat that are disposed side by side to each other, said driver's seat being supported so that it can be moved with respect to the car interior floor along a longitudinal axis of the car body, the lateral wall on the side of the driver's seat being formed with a driver's door opening adjacent the driver's seat, the lateral wall on the side of the assistant driver's seat being formed with an assistant driver's door opening adjacent the assistant driver's seat, a steering shaft installed to project rearwardly upward in front of the driver's seat toward the driver's seat, with a steering wheel mounted on the projecting end of said steering shaft, said construction being characterized in that the rear opening edge of said driver's door opening formed in the lateral wall is positioned rearwardly of the rear opening edge of the assistant driver's door opening formed in the other lateral wall.

2. A construction for automobiles that relates a seat device and a car body to each other as set forth in claim 1, characterized in that of the lateral walls, the one alone, which is formed with said assistant driver's door opening, is formed with a rear door opening adjacent the rear seat device.

3. A construction for automobiles that relates a seat device and a car body to each other as set forth in claim 2, characterized in that a rear door is provided that opens and closes the rear door opening, said rear door being adapted to be moved along the outer surface of the lateral wall for forward travel and for backward travel.

4. A construction for automobiles that relates a seat device and a car body to each other as set forth in claim 1, wherein the driver's seat has a seat cushion supported on the car interior floor for movement along a longitudinal axis of the car body, and a seatback projecting upward from the rear end of said seat cushion and pivotally supported by the rear end of said seat cushion, said construction being characterized in that there is provided a forward inclination preventing means by which when the seatback is forwardly pivoted to assume a forwardly inclined position having substantially the same inclination as that of said steering wheel, its further forward pivoting is prevented.

5. A construction for automobiles that relates a seat device and a car body to each other as set forth in claim 4, characterized in that there is provided a movement preventing means by which when the driver's seat is moved forward until the seatback having assumed the forwardly inclined position to close to the steering wheel, a further forward movement of the driver's seat is prevented.

* * * * *